(12) United States Patent
Kambe et al.

(10) Patent No.: US 6,211,635 B1
(45) Date of Patent: Apr. 3, 2001

(54) BRUSHLESS MOTOR DRIVING SYSTEM FOR DRIVING OUTDOOR FAN OF AIR CONDITIONER

(75) Inventors: Takayuki Kambe, Mishima; Junichi Takuma, Fuji; Tomoaki Toshi, Fujinomiya; Hiroshi Miyazaki, Fuji, all of (JP)

(73) Assignee: Toshiba Carrier Corporation, Tokyo-to (JP)

( * ) Notice: Subject to any disclaimer, the term of this patent is extended or adjusted under 35 U.S.C. 154(b) by 0 days.

(21) Appl. No.: 09/418,358

(22) Filed: Oct. 14, 1999

(30) Foreign Application Priority Data

Oct. 14, 1998 (JP) .................................................. 10-292200

(51) Int. Cl.$^7$ .................................................. H02K 23/00
(52) U.S. Cl. .......................... 318/254; 318/803; 318/801; 318/798; 318/800; 318/802; 318/811
(58) Field of Search ..................... 318/803, 801, 318/798, 800, 802, 811, 254; 363/98

(56) References Cited

U.S. PATENT DOCUMENTS 4,583,028 * 4/1986 Angersbach et al. ................. 318/254
5,233,847 * 8/1993 Tanaka ................................. 318/803
5,280,228 * 1/1994 Kanouda et al. ..................... 318/803

FOREIGN PATENT DOCUMENTS 9-89352    4/1997  (JP) .

* cited by examiner

*Primary Examiner*—Karen Masih
(74) *Attorney, Agent, or Firm*—Foley & Lardner (57) ABSTRACT

This invention relates to a brushless motor driving system for driving an outdoor fan of an air conditioner. The driving system comprises a Hall probe for detecting a position of a rotor of a brushless motor, an inverter circuit consisting of a plurality of switching elements connected in bridge-connection, the inverter circuit supplying ON-OFF electric current to stator coils of the brushless motor, and a control means for switching the switching elements of the inverter circuit based on the output signal of the Hall probe. Before starting the motor, the control means controls the switching elements to supply DC PWM-controlled current to the stator coils of the motor in synchronization with the output signal of the Hall probe, so that the rotor is braked, stopped and set to home position.

15 Claims, 10 Drawing Sheets

ROTOR STOP POSITION WHEN DC EXCITATION

FIG. 4A

CONDUCTION PATTERN WHEN DC EXCITATION

RELATION AMONG CONTROL MODE, DRIVING
SYSTEM AND CONDUCTION PATTERN

| | DTIVING SYSTEM | PATTERN |
|---|---|---|
| DC EXCITATION CONTROL | ONE POSITIVE TRANSISTOR AND TWO NEGATIVE TRANSISTORS ARE SUBJECTED TO PWM CONTROL | A |
| | TWO POSITIVE TRANSISTORS AND ONE NEGATIVE TRANSISTOR ARE SUBJECTED TO PWM CONTROL | B |
| ZERO VECTOR CONTROL | THREE POSITIVE TRANSISTORS ARE TURNED ON. THREE NEGATIVE TRANSISTORS ARE TURNED OFF. | C |
| | THREE POSITIVE TRANSISTORS ARE TURNED OFF. THREE NEGATIVE TRANSISTORS ARE TURNED ON. | D |

FIG.9

EXAMPLES OF COMBINATIONS OF DRIVING SYSTEM AND
CONDUCTION PATTERN

| | BRAKING | | | | | STOPPING D2 | POSITIONING D3 |
|---|---|---|---|---|---|---|---|
| | D11 | D12 | D13 | D14 | D1n | | |
| EXAMPLE 1 | C | C | C | C | ... | DC EXCITATION A or B | DC EXCITATION A or B |
| EXAMPLE 2 | C | D | C | D | ... | | |
| EXAMPLE 3 | D | C | D | C | ... | | |
| EXAMPLE 4 | D | D | D | D | ... | | |
| EXAMPLE 5 | C or D | C or D | A or B | A or B | ... | | |
| EXAMPLE 6 | C or D | A or B | C or D | A or B | ... | | |

BRUSHLESS MOTOR DRIVING SYSTEM FOR DRIVING OUTDOOR FAN OF AIR CONDITIONER

FIELD OF THE INVENTION

This invention relates to a brushless motor driving system for driving an outdoor fan of an air conditioner.

BACKGROUND OF THE INVENTION

Recently, many brushless motors have been used to drive outdoor fans to be installed in the outdoor unit of air conditioners. Even if not driven by motor, the outdoor fan may be rotating by wind, at different rotational directions and speeds. When an outdoor fan happens to be rotating, first, the fan should be applied with brake, stopped and set to home position to start the motor, before the operation of the air conditioner is started.

Normally, the brushless motor necessitates a sensor to detect the present rotor position, that is, the position of the magnetic pole. When braking to stop and setting the outdoor fans to home position, actual rotational direction and speed of the fan are identified based on the output of the sensor, and current is supplied into the stator coil according to the detection data. With the driving systems according to the prior art, however, they used one unit of Hall probe for each phase, that is, three in total, as position sensor, thus causing a complicated control, resulting in high cost.

On the other hand, with the driving systems according to the prior art, when braking to stop and setting to home position, DC current is supplied into stator coil, thus resulting in a possibility of demagnetizing the permanent magnet forming the rotor, or of an excessive current being supplied to destroy the driving circuit for energizing stator coil.

SUMMARY OF THE INVENTION

It is therefore an object of the invention to provide a brushless motor driving system for driving an outdoor fan of an air conditioner, which can make an easier control for braking, stopping and setting to home position of the outdoor fan driven by brushless motor, even if being rotated by external causes such as wind.

It is another object of the invention to provide a brushless motor driving system for driving an outdoor fan of an air conditioner, which can be started without applying excessive load to the driving circuit and the motor, and with minimized demagnetization of the permanent magnet.

To achieve the above-mentioned objects, the first aspect of the present invention provides a brushless motor driving system for driving an outdoor fan of an air conditioner comprising;

a single Hall probe for detecting the position of a rotor of a brushless motor for driving the outdoor fan of the air conditioner.

The driving system also includes an inverter circuit consisting of six switching elements connected in three-phase bridge connection, DC terminals of the inverter circuit being connected to a main DC power source, AC terminals of the inverter circuit being connected to star-connected stator coils of the brushless motor.

The driving system also includes control means for controlling the switching elements in the inverter circuit in synchronization with the output signal from the Hall probe. The control means includes DC excitation means.

Before starting the brushless motor, the DC excitation means controls one switching element of one phase of a positive or negative side of the inverter circuit and switching elements of the other two phases of the other side to supply a PWM-controlled DC current to the stator coils of the motor, thereby bringing the rotor to brake and stop at the home position.

The above DC excitation means can switch current conduction phases to others every time when the Hall probe detects the predetermined magnetic pole position of the rotor, thus resulting in a minimized demagnetization of the permanent magnet.

The above DC excitation means switches current conduction phases to others every time when the Hall probe detects the predetermined magnetic pole position of the rotor, thus resulting in a minimized demagnetization on the permanent magnet.

The DC excitation means controls the duty of the PWM-current according to the rotational speed of the motor based on the magnetic pole position detection signal of the Hall probe. This configuration can speedily bring the rotor to stop while suppressing a possible demagnetization of the permanent magnet.

The inverter circuit comprises a plurality of driving circuits for driving the switching elements individually, an auxiliary DC power supply for directly supplying operating electric power to the negative side of the driving circuits, and a plurality of capacitors each of which is parallel connected to a corresponding one of the positive side driving circuits and is charged up by the auxiliary DC power supply through the negative side switching element of the same phase, the DC excitation means applies PWM-control to the positive side switching elements. The DC excitation means may be better to make PWM-control of the positive side of the switching elements. This configuration can suppress a possible voltage drop of the capacitors to be charged up.

The second aspect of the invention provides a brushless motor driving system for driving an outdoor fan of an air conditioner comprising;

a single Hall probe for detecting the position of a rotor of a brushless motor for driving the outdoor fan of the air conditioner.

The driving system also includes an inverter circuit consisting of six switching elements connected in three-phase bridge connection, DC terminals of the inverter circuit being connected to a main DC power source, AC terminals of the inverter circuit being connected to star-connected stator coils of the brushless motor.

The driving system also includes control means for controlling the switching elements in the inverter circuit in synchronization with the output signal from the Hall probe, where the control means includes zero vector conduction means.

Before starting the brushless motor, the zero vector conduction means turns either one of all of the positive side switching elements and all of the negative side switching elements to on-state and the other to off-state, thereby bringing the rotor to brake and stop at -the home position. This configuration can obtain not only an easier control of braking, stopping and setting to home-position to be made before starting, even if the fan is rotating by external causes, but also an improvement to reduce power consumption.

The third aspect of the invention provides a brushless motor driving system for driving an outdoor fan of an air conditioner comprising;

a single Hall probe for detecting a position of a rotor of a brushless motor for driving the outdoor fan of an air conditioner.

The driving system also includes an inverter circuit consisting of six switching elements connected in three-phase bridge connection, DC terminals of the inverter circuit being connected to a main DC power source, AC terminals of the inverter circuit being connected to star-connected stator coils of the brushless motor.

The driving system also includes control means for controlling the switching elements in the inverter circuit in synchronization with the output signal from the Hall probe, where the control means including DC excitation means.

Before starting the brushless motor, the DC excitation means controls the switching elements in combination of first and second control modes to brake the rotor to stop. The first control mode makes either one of all of the positive side switching elements and all of the negative side switching elements to on-state and the other to off-state, for an either one switching element of one phase of a positive or negative side of the inverter circuit and the other side of the other two-phase. The second control mode applies a PWM-control to either one of the one-phase and two-phase switching elements, and a continuous conduction control to the other. This configuration can have not only an easier stop control for braking, stopping and setting to home position, even if the fan is rotating by external causes, but also a starting operation without applying excessive load to the driving circuit and the motor, and with suppressed demagnetization of permanent magnet.

The control means detects the rotational speed of the motor based on the output signal of the Hall probe, in view of the detected rotational speed, the control means starts braking according to the first control mode when the speed is higher than the predetermined value, while according to the second control mode when the speed is lower than that. This configuration can ensure a desirable stop control for braking, stopping and setting to home position, while keeping minimized power consumption.

Generally, the Hall probe is arranged at a position off-set from the center position of either one phase of the stator coil of the motor in the reverse direction to the rotational one in the normal operation of the motor, the DC excitation means conducts corresponding swithing elements with a certain time of delay for the magnetic pole position detection timing of the Hall probe. The DC excitation means should be energized with a certain time of delay for the detection timing of magnetic pole position, thereby preventing unnecessary acceleration operation at the stationary condition.

Only a single connector is preferably used for supplying the current to the Hall probe and for outputting the detection signal thereof, as well as for supplying the current to the stator coils from the inverter circuit, thereby resulting in a simplified motor structure and a facilitated connection to and detachment from the external.

DETAILED DESCRIPTION OF THE PREFERRED EMBODIMENTS

Figure 1:
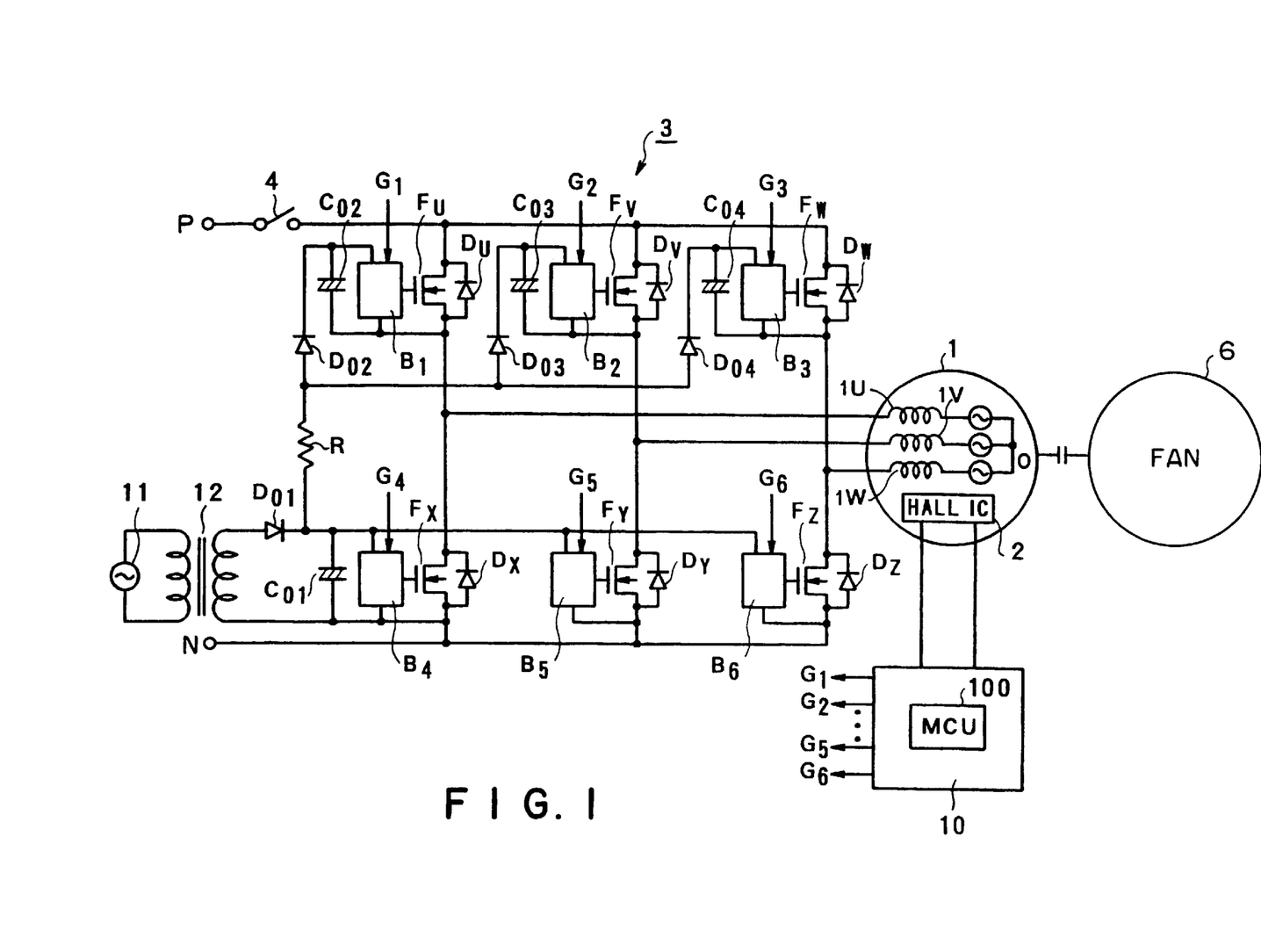
FIG. 1 is a partial block circuit diagram showing an embodiment of the invention.

The following is detailed description of preferred embodiments of the invention, referring to the above drawings:

FIG. 1 is a partial block circuit diagram showing an embodiment of the invention. A brushless motor 1 is used as the driving motor of an outdoor fan 6 installed in an outdoor unit of an air conditioner. Phase coils 1U, 1V and 1W of a stator of the motor 1 are connected in star-connection. The stator is provided with a Hall IC 2 for detecting the rotor position. One side ends of the stator coils 1U, 1V and 1W are connected to AC terminals of an inverter circuit 3. The other side ends are connected to a common neutral point O. Lead wires of the Hall IC 2 for current inputting and detection signal outputting are connected to a control device 10. A rotor 1R of the motor 1 is a permanent magnet rotor.

In the inverter circuit 3, field effect transistors (FETs) Fu, Fv, Fw, Fx, Fy and Fz are connected in three-phase bridge connection as switching elements. A U-phase serial connection circuit consisting of transistors Fu and Fx, a V-phase serial connection circuit consisting of transistors Fv and Fy, and a W-phase serial connection circuit consisting of transistors Fw and Fz are parallel connected to each other. Their positive terminals are connected to a positive pole of a main DC power source (for example DC 280V) (not shown) through a switch 4 and a positive side input terminal P. On the other hand, other ends thereof are connected to a negative pole of the main DC power source through a negative side input terminal N. To these transistors Fu, Fv, Fw, Fx, Fy and Fz, free wheeling diodes Du, Dv, Dw, Dx, Dy and Dz are connected in anti-parallel connection, respectively.

To the respective transistors Fu, Fv, Fw, Fx, Fy and Fz are connected driving circuits B1, B2, B3, B4, B5 and B6 consisting of photo-coupler. To supply operating power to these driving circuits, a transformer 12 is provided. A primary winding of the transformer 12 is connected to an AC power source 11, and a half-wave rectifier circuit consisting of a diode D01 connected in series to a secondary winding of the transformer 12 and a smoothing capacitor C01. The anode of the capacitor C01 is connected to one end of the respective driving circuits B4, B5 and B6 at the negative side of the main DC power source, while the cathode of the capacitor C01 is connected not only to the other end of the respective driving circuits B4, B5 and B6, but also to the respective sources (negative side) of the transistors Fx, Fy and Fz at the negative side of the inverter circuit 3. To the driving circuits B1, B2 and B3 at the positive side of the main DC power supply, parallel connected are capacitors C02, C03 and C04 respectively. Their anodes are connected to the anode of the capacitor C1 through respective diodes D02, D03 and D04 for reverse current prevention and a resistance R for current restriction. The cathodes of the capacitor C02, C03 and C04 are connected to the respective sources of the transistors Fu, Fv and Fw at the positive side of the inverter circuit 3.

To respective interconnection points of transistors Fu and Fx, transistors Fv and Fy, and transistors Fw and Fz, connected are respective coil terminals of the stator coils U, V and W of the brushless motor 1. A signal output lead wire of the Hall IC 2 provided in the brushless motor is connected to a microcomputer unit (MCU) 100 consisting of a control device 10. Control signals G1, G2, G3, G4, G5 and G6 outputted from the MCU 100 are respectively inputted to the driving circuits B1, B2, B3, B4, B5 and B6.

Now, description will be made for the operation of the embodiment according to the invention thus configured as above:

The main DC power supply applies DC 280V to between the DC input terminals P and N of the inverter circuit 3 to which the transistors Fu, Fv, Fw, Fx, Fy and Fz are three-phase bridge connected. The AC power supply 11 is, for example, a commercial AC 100V power supply. The voltage is dropped to, for example, AC 5V by the transformer 12. The step-downed AC is rectified and smoothed by the half-wave rectifier consisting of diode D01 and capacitor C01. In this connection, AC power source 11, transformer 12, diode D01 and capacitor C01 make up an auxiliary DC power source. This DC voltage is applied to both ends of the driving circuits B4, B5 and B6 which respectively drive the negative side transistors Fx, Fy and Fz. When the negative side transistors Fx, Fy and Fz are turned ON, capacitors C02, C03 and C04, which respectively are parallel connected to the driving circuits B1, B2 and B3 driving the positive side transistors Fu, Fv and Fw, are charged up by the both end voltage of the capacitor C01 via resistance R. When the inverter circuit 3 is not operated, a simultaneous ON state of the transistors Fx, Fy and Fz can charge up all of the capacitors C02, C03 and C04. This charged up capacitors can activate all of the driving circuits B1, B2, B3, B4, B5 and B6. The capacitor charge-up circuits C01, C02, C03 and C04 parallel connected to these driving circuits are known as "charge pump system", detailed description of which is omitted (refer to JP A 09-37587). Anyway, during normal operation, the conduction pattern for each switching element can charge up the capacitors C02, C03 and C04.

Before the air conditioner is started, the rotor of the motor 1 for driving the outdoor fan 6, which may be rotating by wind, must be forcibly stopped in view of control, to be brought to home position, thus requiring a stop control of the brushless motor 1 which applies braking thereto, brings to a stop and positions to home position.

Figure 2:
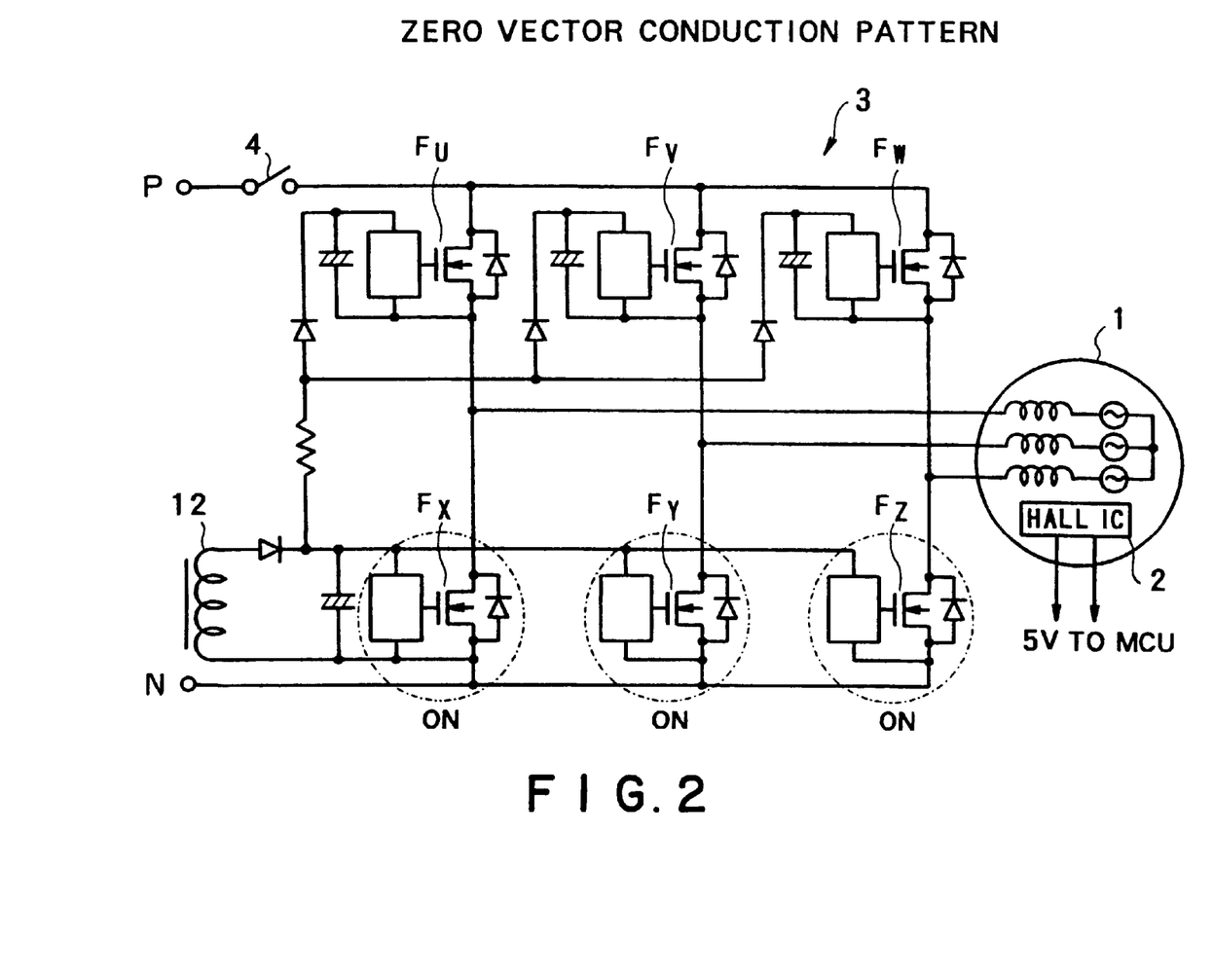
FIG. 2 is an illustration showing the zero vector conduction pattern to describe an operation according to an embodiment of the invention.

One of applicable methods is shown in FIG. 2. MCU 100 provides respective control signals G1, G2, G3, G4, G5 and G6 to the driving circuits B1, B2, B3, B4, B5 and B6. As shown in FIG. 2, these control signals make ON-state all of the negative side transistors Fx, Fy and Fz while all of the positive side transistors Fu, Fv and Fw are kept OFF-state. Otherwise (not shown), this input turns ON all of the positive side transistors Fu, Fv and Fw while all of the negative side transistors Fx, Fy and Fz are kept OFF-state. This condition instantly changes the outdoor fan 6 to a kind of prime mover, thereby circulating currents generated in the rotating brushless motor 1 via the inverter circuit 3, thus resulting in application of brake to the motor 1 and the outdoor fan 6. This method makes the voltage vectors of the stator coils U, V and W to zero, that is why this method is called "braking according to zero vector conduction pattern" in this specification. Under rather strong wind, this braking may be difficult to bring the outdoor fan 6 to a complete stop, only with continued consumption of regenerated energy, but it may be possible to bring the outdoor fan 6 to a complete stop when the fan is rotating by inertia without external force. The unnecessary power supply as opposed to the braking method by DC excitation can reduce power consumption.

Figure 3:
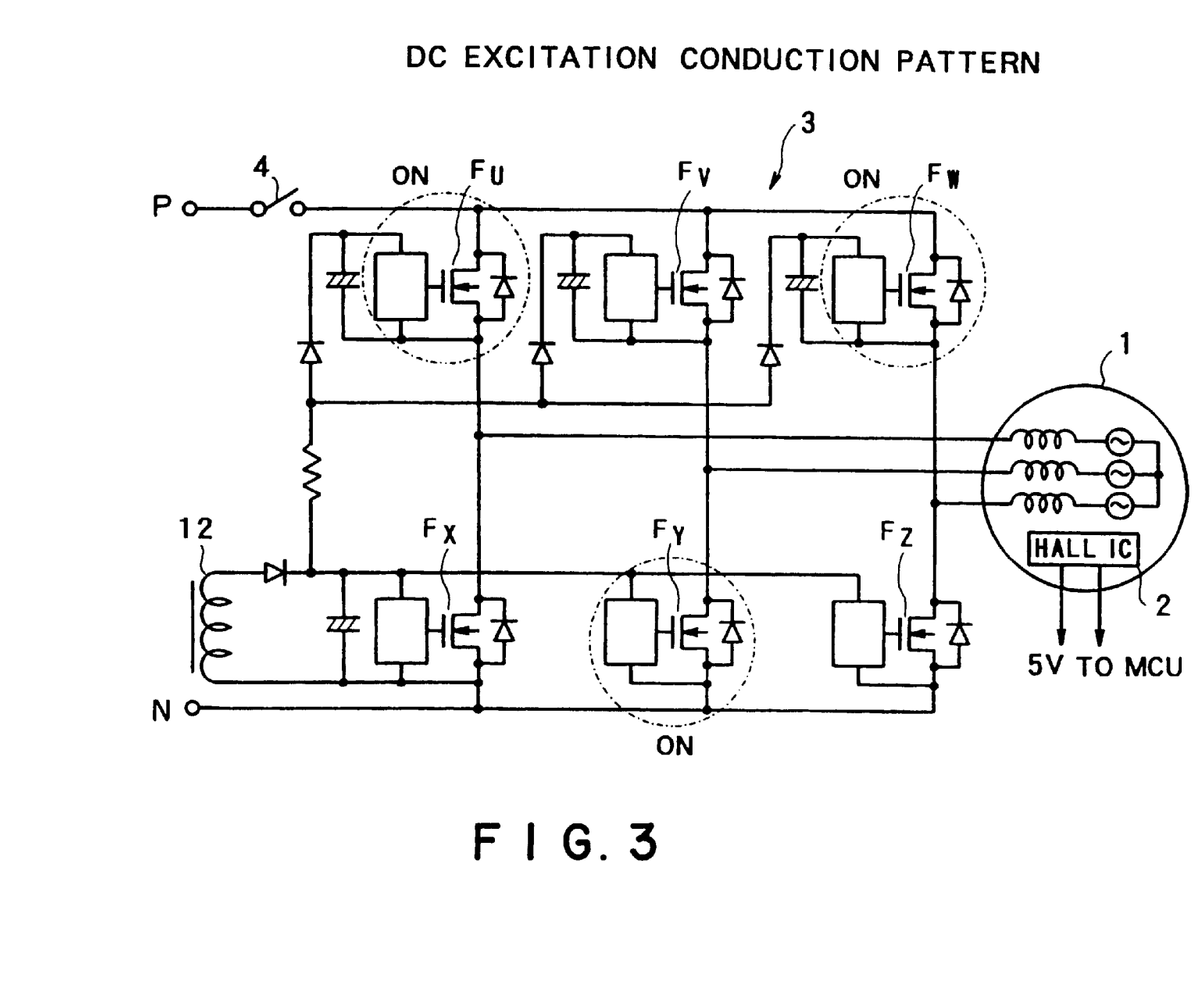
FIG. 3 is an illustration showing the DC excitation conduction pattern to describe an operation according to an embodiment of the invention.

Another applicable method is shown in FIG. 3:

MCU 100 inputs respective control signals G1, G2, G3, G4, G5 and G6 selectively to driving circuits B1, B2, B3, B4, B5 and B6. As shown in FIG. 3, MCU 100 turns ON any one-phase switching element (Fy, here) among the three-phase switching elements at either one (negative) of the positive and negative sides and other two-phase switching elements (Fu and Fw) at the other (positive) side according to the pulse width modulation (PWM) control system, thereby carrying PWM-controlled DC currents to the stator coils U, V and W, to generate a predetermined direction of magnetic field, thus bringing the rotor of the motor 1 to a stop. This method is called "braking according to DC excitation conduction pattern" in this specification. When compared to the well-known DC braking method according to the prior art, this pattern of braking carries PWM current, thereby not only never applying excessive load to the driving circuits and the motor, but also minimizing a possible demagnetization of permanent magnet.

Figure 4A:
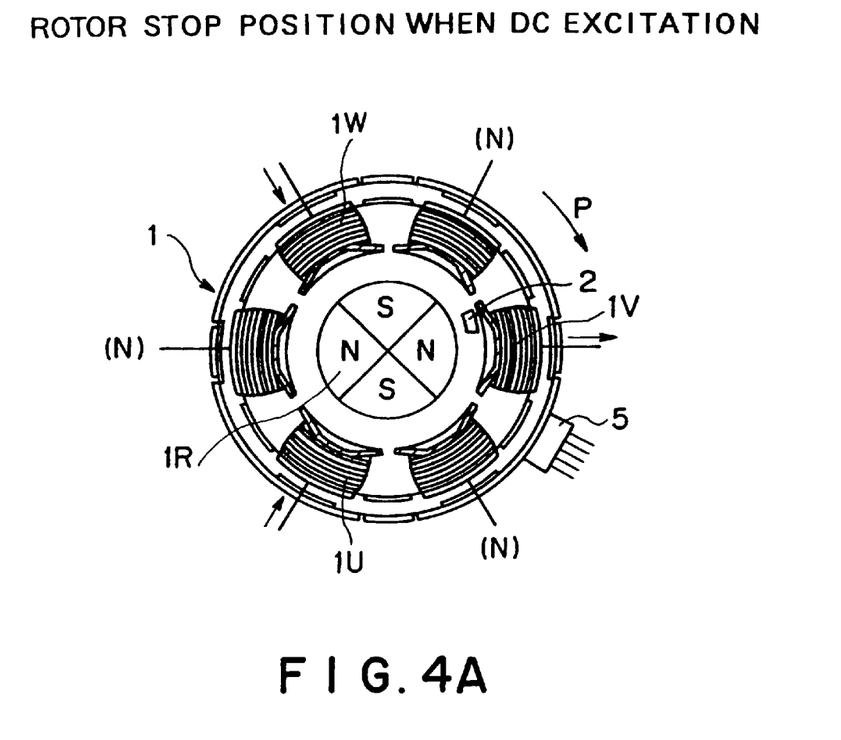
FIG. 4A is an illustration showing the stop position of the rotor to be taken when the brushless motor is DC excited.
Figure 4B:
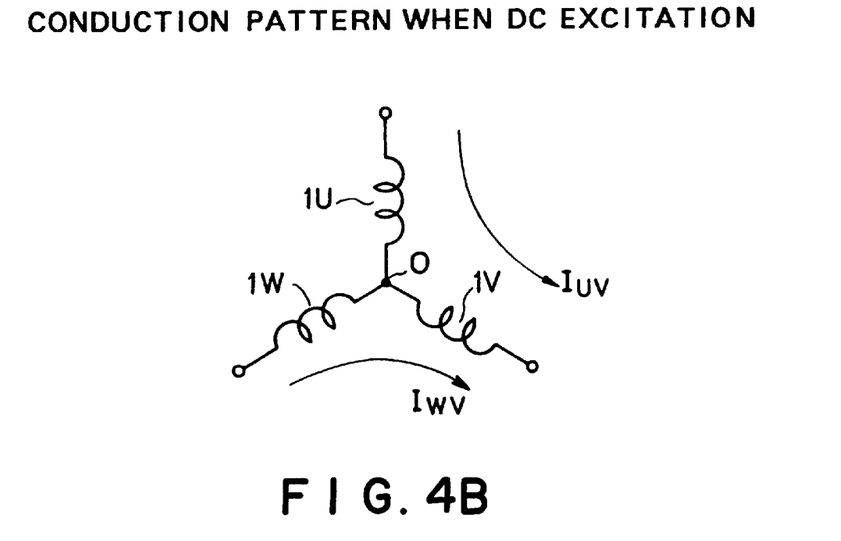
FIG. 4B is an illustration showing the conduction pattern for the stator coils to be used in FIG. 4A.

FIG. 4A is an illustration showing the stop home position of the rotor to be taken when the brushless motor is DC excited; and FIG. 4B is an illustration showing the connection and conduction pattern of the stator coils to be used in FIG. 4A. The positive side transistors Fu and Fw and the negative side transistor Fy turned on by the PWM system supply positive PWM currents Iuv and Iwv to U-phase coil 1U and W-phase coil 1W, and a negative PWM current equivalent to the sum of two-phase PWM currents to V-phase coil 1V. Magnetic field generated by these currents can bring the rotor 1R made of permanent magnet to braking for a stop at the home position shown in FIG. 4A. According to the embodiment, viewing in the rotational direction P of the rotor 1R, the Hall IC 2 is shifted in a direction nearer to the U-phase coil 1U than the center of the V-phase coil 1V, that is, at a position offset toward the reversal direction to the rotational direction P, so that the Hall IC 2 is oppositely facing to the rear end of the N magnetic pole of the rotor 1R, when home-positioned rotor 1R is taken as datum. Therefore, when electric currents Iuv and Iwv are supplied right after the Hall IC 2 detects the N magnetic pole of the rotor 1R, the rotor 1R comes to a stop at an acceleration position, so that MCU 100 must have a certain time of delay for the magnetic pole position detection timing of the Hall IC 2. The time of delay depends on the actual rotational speed. The larger the rotational speed, the shorter the time of delay.

Among the two braking method, the zero vector conduction pattern can suppress external electric power to be supplied to zero, while the DC excitation conduction pattern may consume a certain amount of electric power but speedy braking can be expected. Therefore, when natural wind is rotating the outdoor fan 6 at a higher speed than the predetermined value, the zero vector conduction pattern may take much more time for braking while the DC excitation conduction pattern requires a relatively large current, so that these two braking, stopping and setting to home position controls are not directly carried out, but we have to wait until the speed comes down lower or take some actions to lower the speed. In this case, even if stop control is not made, higher rotational speed may achieve a heat exchange effect as heat exchanger by an outdoor fan 6 energized by external wind.

Figure 5:
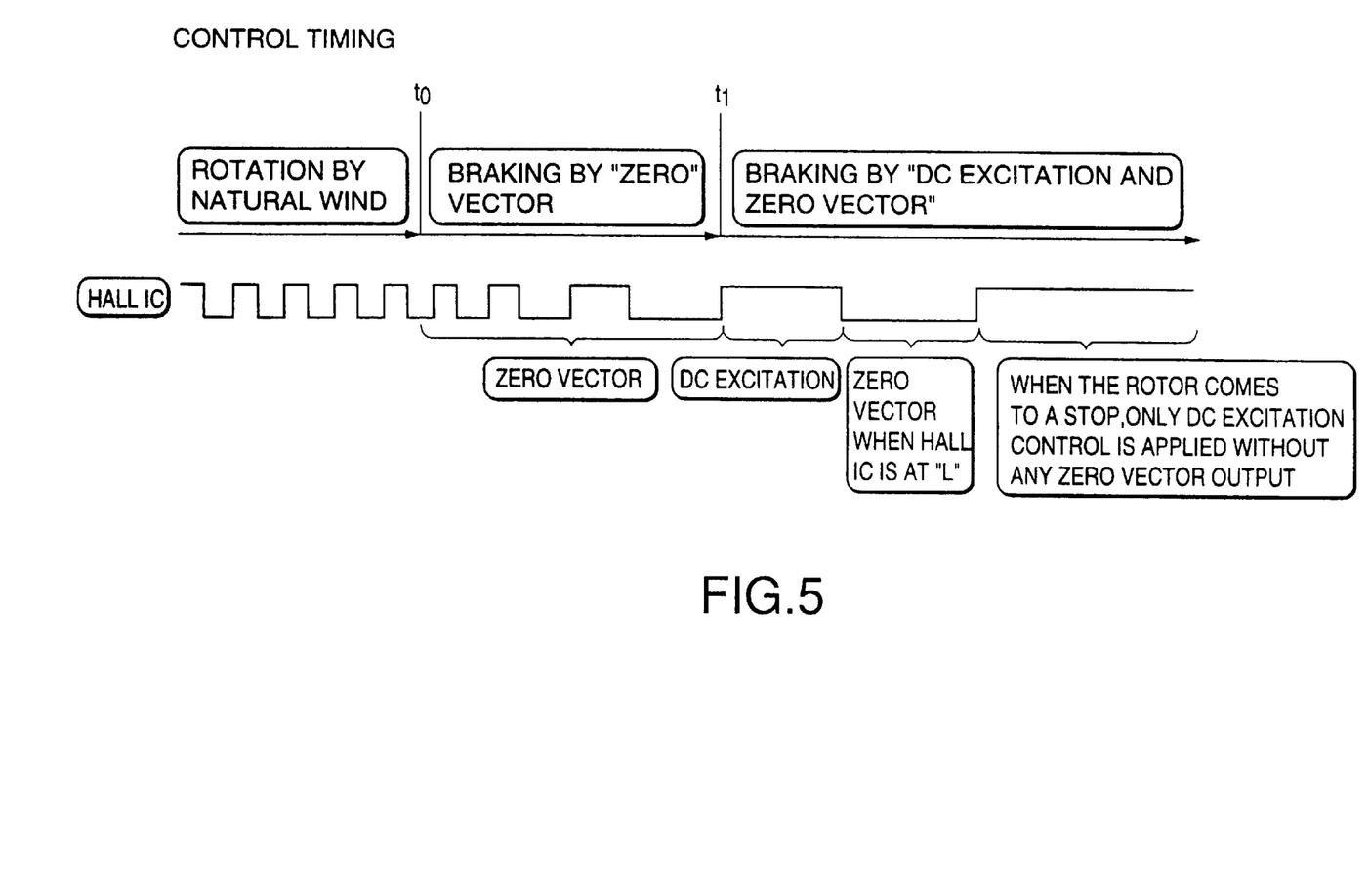
FIG. 5 is a time chart showing one example of the braking, stopping and setting to home position controls, to describe an operation according to an embodiment of the invention.

FIG. 5 is a time chart showing one example of the braking, stopping and setting to home position controls to be taken when the outdoor fan 6 is rotating by natural wind. In this case, when the Hall IC 2 detected the N magnetic pole of the rotor 1R, the Hall IC 2 outputs "H" level signal, while the Hall IC 2 detected the S magnetic pole of the rotor 1R, the Hall IC 2 outputs "L" level signal. Therefore, when the fan 6 is rotating at a relatively high speed, the Hall IC 2 may again and again output a short period of rectangular-wave signals. As braking operations, the recycle period becomes longer. As shown in FIG. 4A, when the N magnetic pole of the rotor 1R comes to a stop at a position facing the Hall IC 2, the Hall IC 2 continues to output the "H" level signal. FIG. 5 shows a time chart showing one example of the braking, stopping and setting to home position controls to be taken under the following condition:

At time $t_0$, braking by the zero vector conduction pattern is started, and then the rotational speed comes down to the predetermined value. At time $t_1$, when the Hall IC 2 outputs the "H" signal, braking by the DC excitation conduction pattern is executed, and then when the Hall IC 2 outputs the "L" signal, again braking by the zero vector conduction pattern is repeated. And then, when the output signal of the Hall IC 2 continues to output "H" level, the excitation by the DC excitation conduction pattern is continued assuming that stop and setting to home position controls have been completed.

Figure 6:
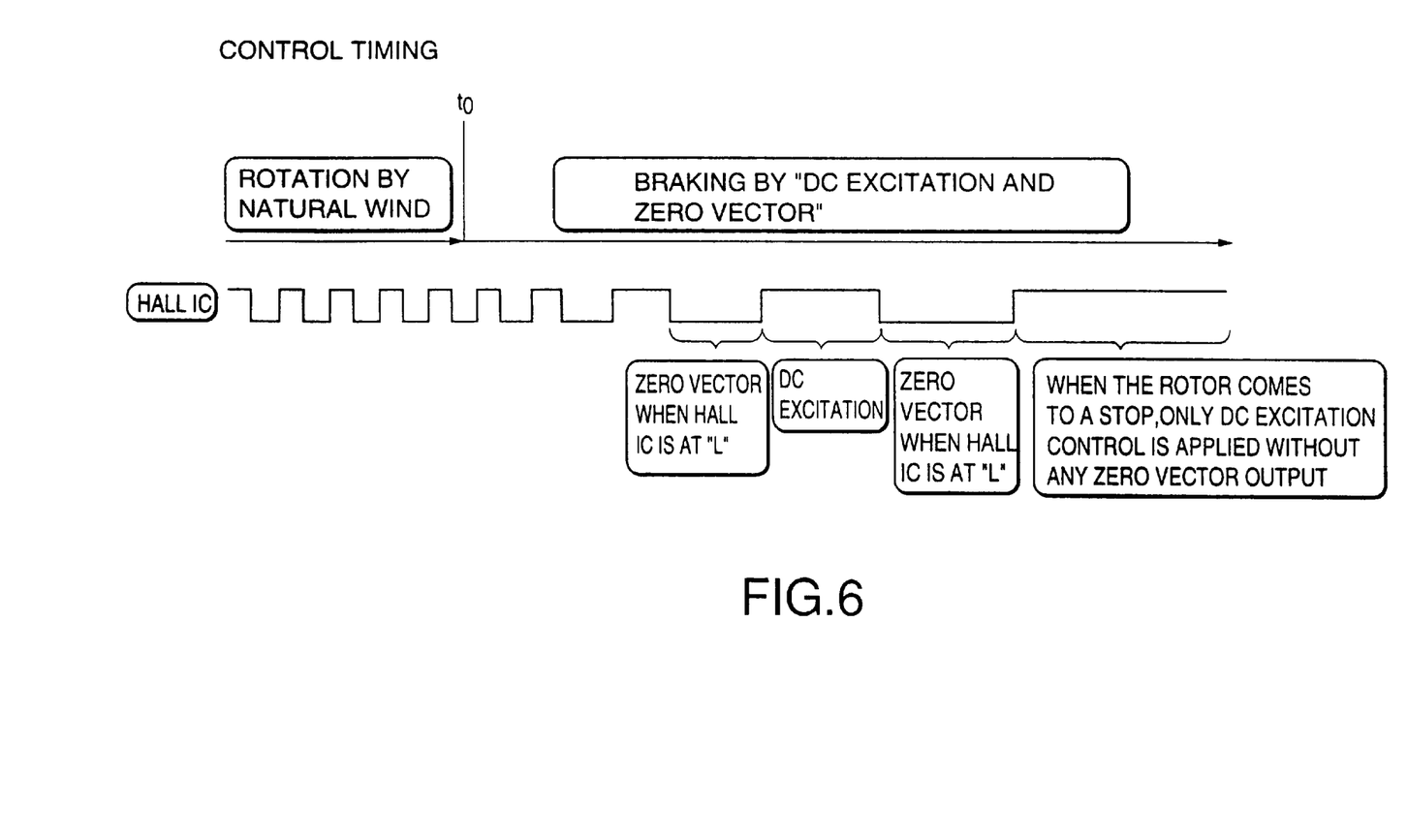
FIG. 6 is a time chart showing another example of the braking, stopping and setting to home position controls, to describe an operation according to an embodiment of the invention.

FIG. 6 is a time chart showing another example of the braking, stopping and setting to home position controls, which can be used to execute stop control for braking, stopping and setting to home position when the fan 6 is rotating by natural wind. This control starts at time $t_0$ when the rotating speed is detected. When the output signal of the Hall IC 2 is "L" level, the zero vector conduction pattern is activated, while at "H" level, braking by the DC excitation conduction pattern is repeated, thus finally coming to a stop and setting to home position.

Figure 7:
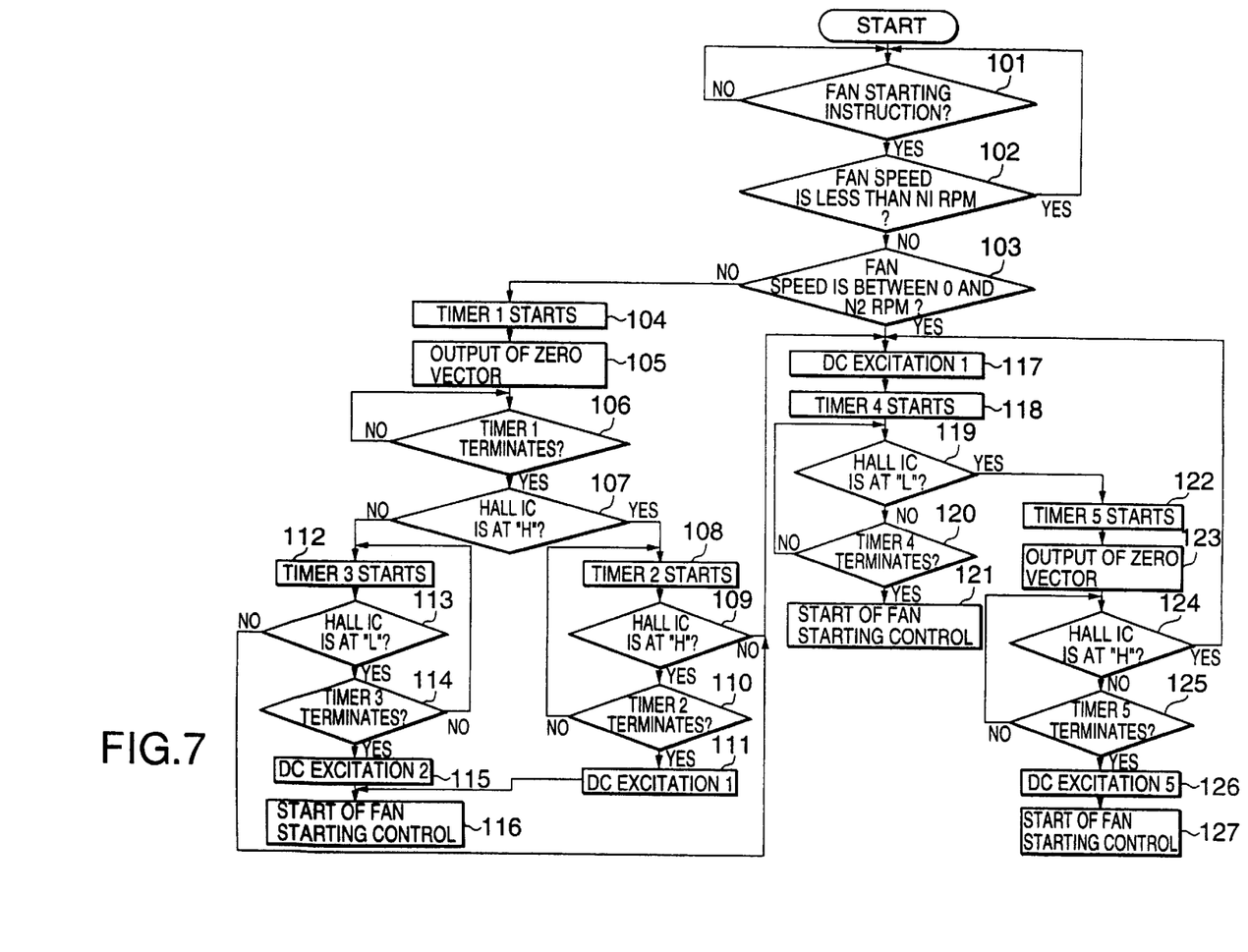
FIG. 7 is a flow chart showing a specific processing procedure of MCU constituting an embodiment according to the invention.

FIG. 7 is a flow chart showing a specific processing procedure of MCU provided for executing the stop control shown in FIG. 5 to brake, stop and set to home position. Step 101 judges whether operation instruction has been inputted or not. When YES, step 102 detects the rotational speed of the fan 6 based on the switching frequency of output signal level of the Hall IC 2, to determine whether the speed is lower than the upper limit speed N1 for executing the braking operation. When YES, step 102 goes to step 103. When NO, the stop control is suspended. S 103 judges whether the speed is in between 0 and N2 (N2<N1). When higher than N2, step 103 goes to Step 104 to execute following procedures. When YES, step 103 goes to step 117 to execute following procedures.

Now, detailed description will be made for the operations starting from Step 104: To suppress a possible power consumption in view of the higher rotational speed of the fan 6, first, braking operation is executed by the zero vector conduction pattern for a certain time of period, and then, stopping and setting to home position operations are executed by the DC excitation conduction pattern. At step 104, a timer 1 in which braking time by the zero vector conduction pattern has been set is started. Step 105 executes the braking operation. Step 106 judges whether the set time of the timer 1 has passed, to stop braking operation. Step 107 judges whether the output of the Hall IC 2 is "H" level.

(1) When "H" level is maintained for a predetermined time, step 107 determines that the fan 6 has been brought to a stop. Step 108 activates a timer 2. Step 109 judges again whether the output of the Hall IC 2 is "H" level. When "H" level has been maintained, step 110 judges whether a preset time of the timer 2 has passed. When YES, step 111 switches the acting zero vector conduction pattern over to a conduction pattern by DC excitation 1 to hold the "H" level. Step 116 activates the starting control of the fan 6.

(2) When "H" level is not maintained for a predetermined time at step 107, that means that the fan 6 is not yet brought to a complete stop. Step 117 (to be described in detail later) starts the braking operation by the conduction pattern of DC excitation 1.

On the other hand, even when only the braking operation by the zero vector conduction pattern brought the fan 6 to a stop, the output level of the Hall IC 2 may happen to be "L". When step 107 judges that the level is not "H", step 112 starts a timer 3. Step 113 judges whether the output of the Hall IC is "L" level. When "L" level is maintained, step 114 judges whether the set time of the timer 3 has passed. When YES, step 115 switches the acting conduction pattern over to the conduction pattern of DC excitation 2 to hold the "L" level. Finally, step 116 starts the starting control of the fan 6. In this connection, when step 113 judges that the output of the Hall IC is not "L" level, that means that the fan 6 is not yet brought to a complete stop. Step 117 (to be described in detail later) starts the braking operation by the conduction pattern of DC excitation 1.

The operation at step 117 starts based on the assumption that the speed of the fan 6 has dropped down to lower than the speed N2, to execute the braking operation by the conduction pattern of DC excitation 1 to hold the output level of the Hall IC to "H". In this case, the higher the speed, the duties of PWM currents Iuv and Iwv must be made larger. In this connection, as shown in FIG. 4B, when carrying PWM currents Iuv and Iwv, either one of the positive side of transistors Fu and Fw and the negative side of transistor Fy is subjected to the PWM control, while the other is simply turned ON. The way of the transistors Fu and Fw to be subjected to the PWM control is advantageous in comparison to the case of continuous conduction, in that voltage drop of capacitors C02 and C04 as driving power source of the driving circuit B1 and B3 can be suppressed. Step 118 starts a timer 4, to judge whether the output level of the Hall IC 2 maintains "H" for a predetermined time. Step 119 judges whether the output signal has been changed to "L". When NO or when "H" is maintained, Step 120 judges whether the set time of the timer 4 has passed. When NO, step 119 and step 120 are repeated. In the meantime, assuming that the stopping and setting to home position controls have been over, step 121 starts the starting control of the fan 6.

On the other hand, when step 119 judges that the output signal has been changed to "L", step 122 starts a timer 5, to execute the braking and stopping controls by the zero vector conduction pattern, and first, step 123 executes the braking control by the zero vector conduction pattern. Then, step 124 judges whether the output signal of the Hall IC 2 has changed to "H" level. When YES, step 124 returns back again to step 117 to execute the following steps up to step 121 which activates the starting control of the fan 6.

Further, when step 124 judges that the output signal of the Hall IC 2 has not changed to "H" level, step 125 judges whether the set time of the timer 5 has passed. When NO, step 124 and step 125 are repeated until the set time of the timer 5 has passed. When the set time of the timer 5 has passed, assuming that the fan 6 has been brought to a stop, step 126 executes the setting to home position control by the conduction pattern of the DC excitation 2 which maintains the "L" output level of the Hall IC 2. Finally, step 127 activates the starting control of the fan 6.

As explained in the above description, when the speed of the Fan 6 is higher than the preset N1, the starting control is brought to a stop, while, when between N2 and N1, the braking control by the zero vector conduction pattern is executed for a certain time of period.

(1) If the output level of the Hall IC 2 is "H" at the time when only the braking control by the zero vector conduction pattern could bring the fan 6 to a stop, home position is set by the conduction pattern of the DC excitation 1 to maintain the "H" level, and then the starting control of the fan 6 is activated.

(2) If the output level of the Hall IC 2 is "L", home position is set by the conduction pattern of the DC excitation 2 to maintain the "L" level, and then the starting control of the fan 6 is activated.

On the other hand, when the speed of the fan 6 is lower than N1 and higher than N2, or lower than N2, or when only the braking control by the zero vector conduction pattern could not bring the fan 6 to a complete stop, braking control is executed by the conduction pattern of DC excitation 1. At this time, if the output level of Hall IC 2 is maintained at "H" for a certain duration of time, the starting control of the fan 6 is activated. Further, when the above-mentioned braking control executed by the conduction pattern of DC excitation 1 could not bring the fan 6 to a complete stop, again the braking control by the zero vector conduction pattern is executed to bring it to a complete stop. At this time, if the output level of the Hall IC 2 is "L", the setting to home position control according to the conduction pattern by DC excitation 2 to hold the "L" level is carried out to activate the starting control of the Fan 6.

Figure 8:
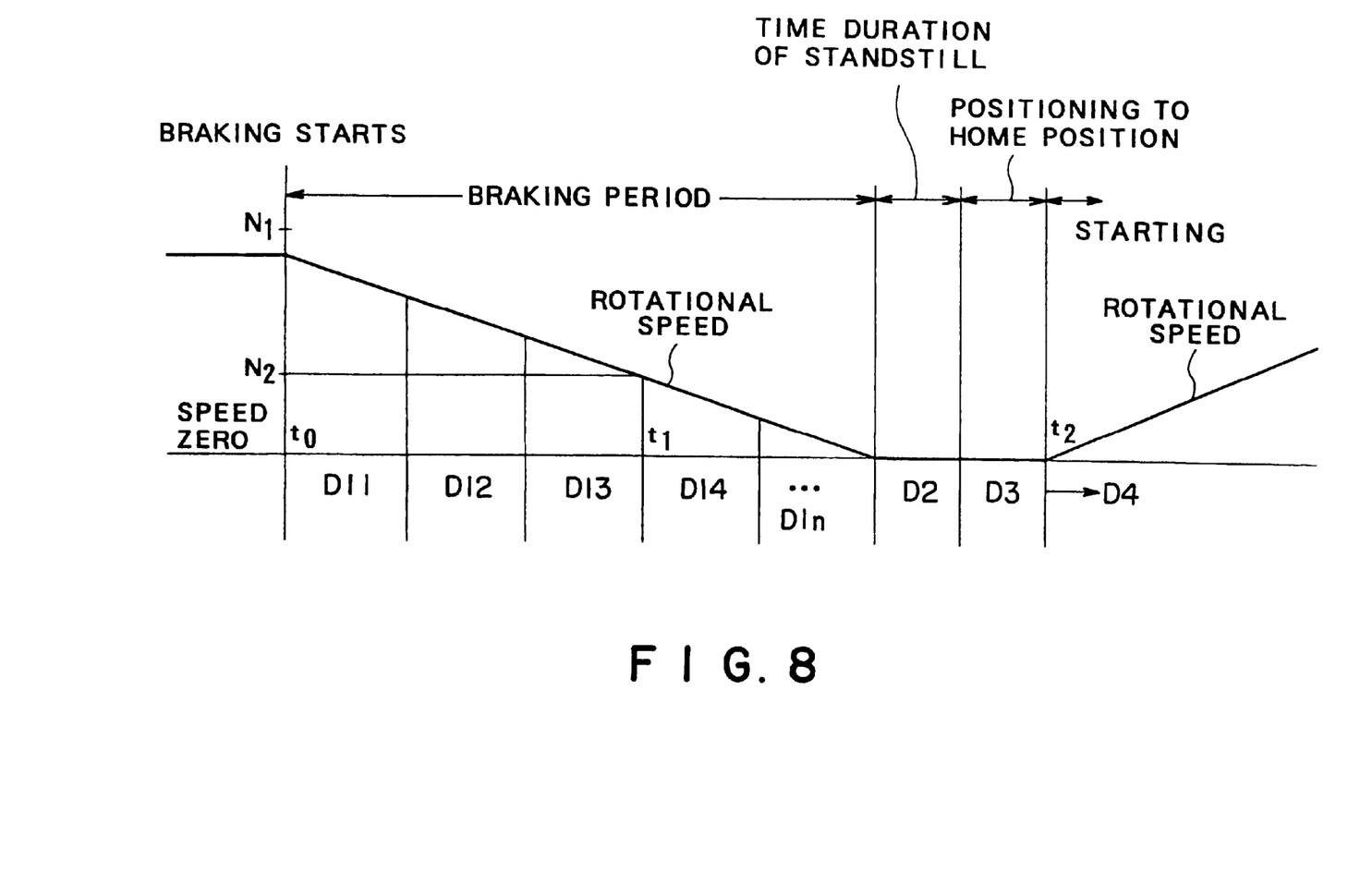
FIG. 8 is a time chart showing one example of the braking, stopping and setting to home position controls, to describe an operation according to an embodiment of the invention.

FIG. 8 is a time chart showing one example of the speed change of the fan 6, when the braking, stopping and setting to home position controls are executed according to the processing procedures as shown in FIG. 7. This time chart corresponds to a case when start instruction is issued under a condition where the fan speed is lower than N1 and higher than N2. More particularly, at time $t_0$ when the start instruction is issued, the braking control by the zero vector conduction pattern is executed. Then, if the braking control could not bring the fan 6 to a complete stop, the two type of braking controls by the DC excitation conduction pattern and the zero vector conduction pattern are alternatively repeated (for time duration of D11, D12, . . . , D1n). After standstill condition has been identified for a certain time of duration (D2), the setting to home position control is executed (for a time duration D3), and then finally the activation control is started (for a time duration D4).

Figure 9:
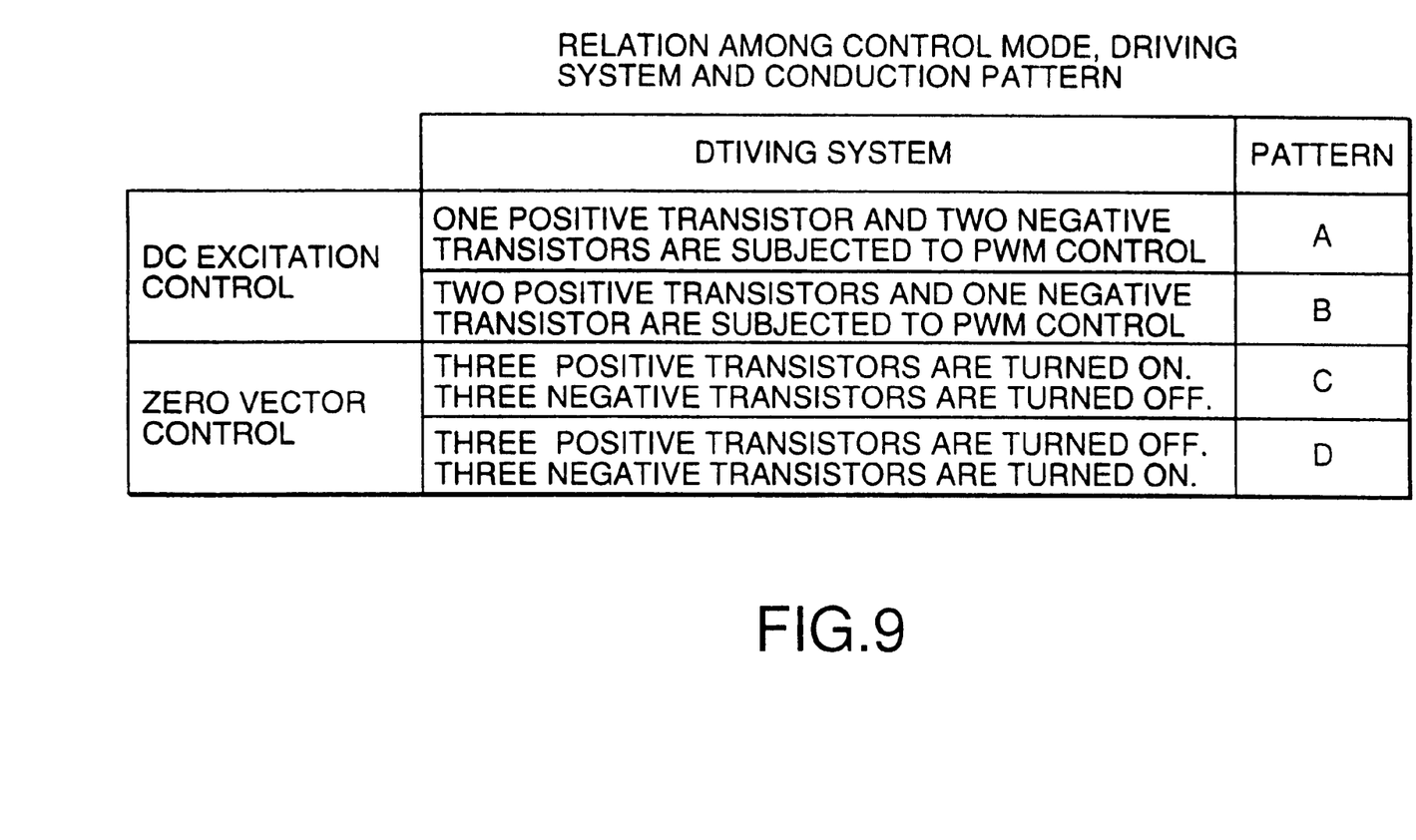
FIG. 9 is an illustrative table showing the relation among control mode, driving method and conduction pattern.

FIG. 9 is an illustrative table showing the four combinations "A", "B", "C" and "D" of fan control modes according to the two types of DC excitation and zero vector conduction patterns and fan driving methods:

"A": One of the three positive side of transistors Fu, Fv and Fw constituting the inverter circuit 3 is subject to PWM control, while two of the three negative side of transistors Fx, Fy and Fz are subject to PWM-control;

"B": Two of the three positive side of transistors Fu, Fv and Fw constituting the inverter circuit 3 are subject to PWM control, while one of the three negative side transistors Fx, Fy and Fz is subject to PWM-control;

"C": All of the three positive side transistors Fu, Fv and Fw are turned ON, while all of the three negative side of transistors Fx, Fy and Fz are turned OFF; and "D": All of the three positive side transistors Fu, Fv and Fw are turned OFF, while all of the three negative side transistors Fx, Fy and Fz are turned ON.

Figure 10:
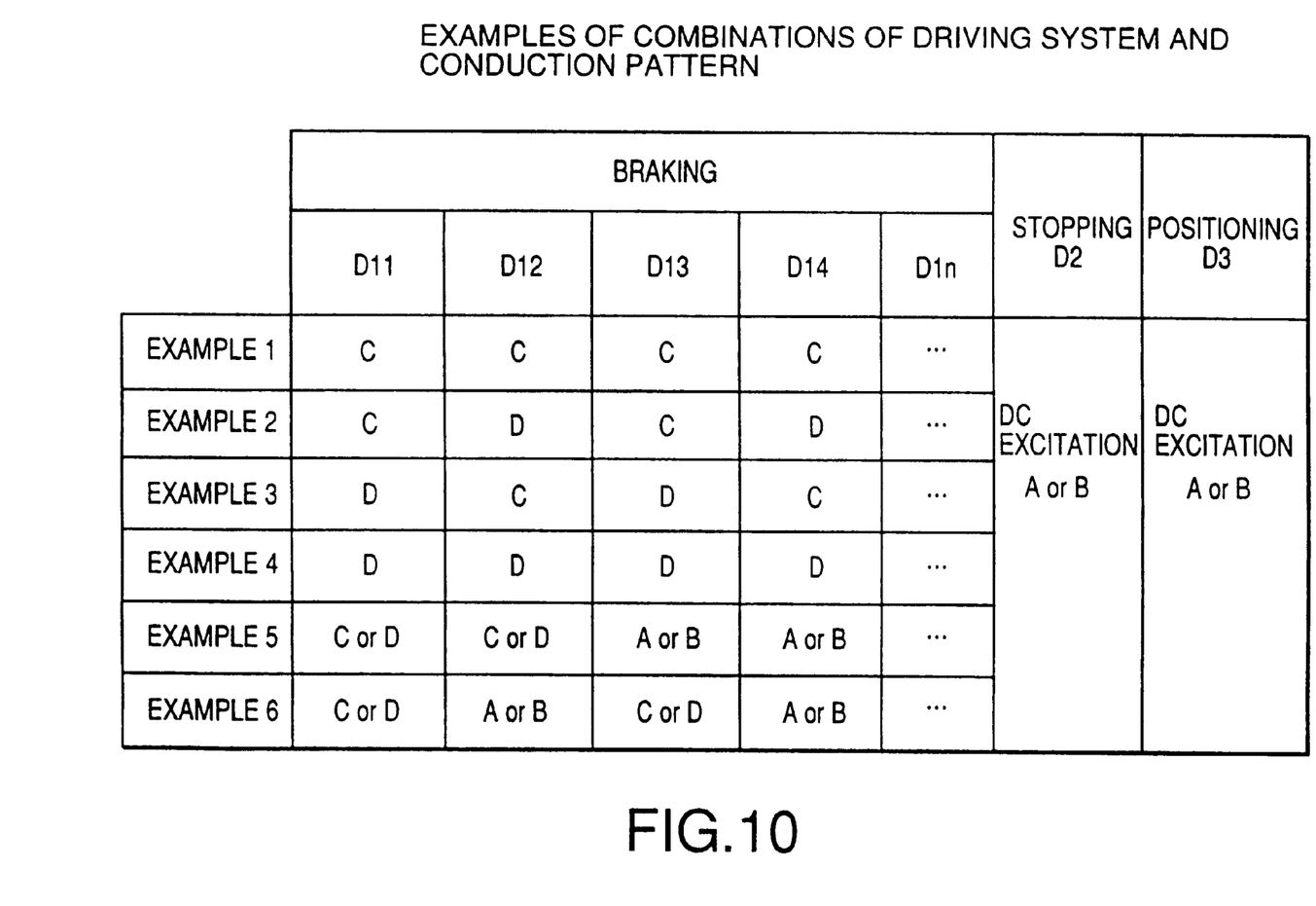
FIG. 10 is an illustrative table showing examples of combinations of driving system and conduction pattern to be used for control by an embodiment of the invention.

The variety of braking, stopping, setting to home-position and start controls explained referring to the flow chart shown in FIG. 7 correspond to either one of embodiments 1, 2, 3, 4, 5 and 6 in FIG. 10, when using the conduction patterns "A", "B", "C" and "D" shown in FIG. 9.

With the above embodiments, as shown in FIG. 4B, the winding start ends of the stator coils 1U, 1V and 1W of the motor 1 are interconnected to each other at the neutral point O, while the winding terminating ends are led out to the external. The Hall IC 2 requires lead wires for supplying electric current and outputting voltage signals corresponding to magnetic field. One connector 5 is used for connecting the stator coils 1U, 1V and 1W and the current supply and signal outputting lead wires of the Hall IC 2 to the external. These considerations can realize a simplified configuration. Further, with the embodiments, the above-described DC excitation conduction pattern supplies electric current to the U-phase coil 1U and the V-phase coil 1V of the stator. Switch-over of conduction phases to be made at each time when the Hall IC 2 outputs a predefined magnetic pole position detection signal can prevent possible complications caused by excessive overload to the driving circuit and the motor.

What is claimed is:

1. A brushless motor driving system for driving an outdoor fan of an air conditioner comprising:

a single Hall probe for detecting a position of a rotor of a brushless motor for driving the outdoor fan of the air conditioner;

an inverter circuit consisting of six switching elements connected in a three-phase bridge connection, DC terminals of the inverter circuit being connected to a main DC power source, AC terminals of the inverter circuit being connected to star-connected stator coils of the brushless motor; and control means for controlling the switching elements in the inverter circuit in synchronization with an output signal from the Hall probe so as to generate a predetermined magnetic field in a direction of braking a rotation of the rotor, the control means including DC excitation means, wherein before starting the brushless motor, said DC excitation means controls one switching element of one phase of a positive or negative side of said inverter circuit and switching elements of the other two phases of the other side to supply a pulse width modulation (PWM) controlled DC current to the stator coils of the motor, thereby bringing the rotor to brake and stop at a first position.

2. A brushless motor driving system according to claim 1, wherein said DC excitation means switches current conduction phases to others every time when said Hall probe detects the predetermined magnetic pole position of the rotor.

3. A brushless motor driving system according to claim 1, wherein said DC excitation means controlls the duty of the PWM-current according to the rotational speed of the motor based on the magnetic pole position detection signal of said Hall probe.

4. A brushless motor driving system according to claim 1, wherein said inverter circuit comprises a plurality of driving circuits for driving the switching elements individually, an auxiliary DC power supply for directly supplying operating electric power to the negative side of the driving circuits, and a plurality of capacitors each of which is parallel connected to a corresponding one of the positive side driving circuits and is charged up by the auxiliary DC power supply through the negative side switching element of the same phase, said DC excitation means applies PWM-control to the positive side switching elements.

5. A brushless motor driving system according to claim 1, wherein said Hall probe is arranged at a position off-set from the center position of either one phase of the stator coil of the motor in the reverse direction to the rotational one in the normal operation of the motor, said DC excitation means conducts corresponding switching elements with a certain time of delay for the magnetic pole position detection timing of said Hall probe.

6. A brushless motor driving system according to claim 1, further comprising a single connector for supplying the current to said Hall probe and for outputting the detection signal thereof, as well as for supplying current to the stator coils from said inverter circuit.

7. A brushless motor driving system for driving an outdoor fan of an air conditioner comprising:

a single Hall probe for detecting the position of a rotor of a brushless motor for driving the outdoor fan of the air conditioner;

an inverter circuit consisting of six switching elements connected in a three-phase bridge connection, DC terminals of said inverter circuit being connected to a main DC power source, AC terminals of said inverter circuit being connected to star-connected stator coils of the brushless motor; and control means for controlling the switching elements in the inverter circuit in synchronization with an output signal from the Hall probe, said control means including zero vector conduction means, wherein before starting the brushless motor, said zero vector conduction means turns either one of all of positive side switching elements and all of negative side switching elements to on-state and the other to off-state, thereby bringing the rotor to brake and stop at a first position.

8. A brushless motor driving system according to claim 7, wherein the control means controls the switching elements in the inverter circuit in synchronization with the output signal from the Hall probe so as to generate a predetermined magnetic field in a direction of braking a rotation of the rotor.

9. A brushless motor driving system according to claim 7, wherein said Hall probe is arranged at a position off-set from the center position of either one phase of the stator coil of the motor in the reverse direction to the rotational one in the normal operation of the motor, said DC excitation means conducts corresponding switch elements with a certain time of delay for the magnetic pole position detection timing of said Hall probe.

10. A brushless motor driving system according to claim 7, further comprising a single connector for supplying the current to said Hall probe and for outputting the detection signal thereof, as well as for supplying current to the stator coils from said inverter circuit.

11. A brushless motor driving system for driving an outdoor fan of an air conditioner comprising:

a single Hall probe for detecting a position of a rotor of a brushless motor for driving the outdoor fan of an air conditioner;

an inverter circuit consisting of six switching elements connected in three-phase bridge connection, DC terminals of said inverter circuit being connected to a main DC power source, AC terminals of said inverter circuit being connected to star-connected stator coils of the brushless motor; and control means for controlling the switching elements in the inverter circuit in synchronization with an output signal from the Hall probe, wherein said control means including DC excitation means, wherein before starting the brushless motor, said DC excitation means controls the switching elements in combination of first and second control modes to brake the rotor to stop, said first control mode making either one of all of the positive side switching elements and all of negative side switching elements to on-state and the other to off-state, for an either one switching element of one phase of a positive or negative side of the inverter circuit and the other side of the other two-phase, the second control mode applying a PWM-control to either one of the one-phase and two-phase switching elements, and a continuous conduction control to the other.

12. A brushless motor driving system according to claim 11, wherein said control means detects the rotational speed of the motor based on the output signal of the Hall probe, in view of the detected rotational speed, said control means starts braking according to the first control mode when the speed is higher than the predetermined value, while according to the second control mode when the speed is lower than that.

13. A brushless motor driving system according to claim 11, wherein said Hall probe is arranged at a position off-set from the center position of either one phase of the stator coil of the motor in the reverse direction to the rotational one in the normal operation of the motor, said DC excitation means conducts corresponding switching elements with a certain time of delay for the magnetic pole position detection timing of said Hall probe.

14. A brushless motor driving system according to claim 11, further comprising a single connector for supplying the current to said Hall probe and for outputting the detection signal thereof, as well as for supplying the current to the stator coils from said inverter circuit.

15. A brushless motor driving system for driving an outdoor fan of an air conditioner comprising:

a probe for detecting a rotor position, the probe disposed in a stator of a brushless motor for driving the outdoor fan of the air conditioner;

an inverter circuit consisting essentially of six switching transistors connected in a three-phase bridge connection, DC terminals of the inverter circuit being connected to a main DC power source, AC terminals of the inverter circuit being connected to star-connected stator coils of the brushless motor; and a switching transistor controller coupled to the switching transistors and in synchronization with an output signal from the probe so as to generate a predetermined magnetic field in a direction of braking a rotation of the rotor, the controller being under DC excitation, wherein, before a starting of the brushless motor, said DC excitation controls one switching transistor of one phase of a positive or negative side of said inverter circuit and switching elements of the other two phases of the other side to supply a pulse width modulation (PWM) controlled DC current to the stator coils of the motor, thereby bringing the rotor to brake and stop at a first position.

* * * * *